(12) United States Patent
Karle

(10) Patent No.: US 7,080,582 B2
(45) Date of Patent: Jul. 25, 2006

(54) SCREWDRIVER TOOL

(75) Inventor: Otmar Karle, Vörstetten (DE)

(73) Assignee: Wiha Werkzeuge GmbH, Schonach (DE)

( * ) Notice: Subject to any disclaimer, the term of this patent is extended or adjusted under 35 U.S.C. 154(b) by 0 days.

(21) Appl. No.: 11/042,568

(22) Filed: Jan. 25, 2005

(65) Prior Publication Data

US 2005/0178253 A1 Aug. 18, 2005

(30) Foreign Application Priority Data

Feb. 13, 2004 (DE) .................. 10 2004 007 066

(51) Int. Cl.
*B25B 23/159* (2006.01)
(52) U.S. Cl. ..................... 81/477; 81/467; 81/475
(58) Field of Classification Search ............... 81/477, 81/475, 467, 478, 480, 481
See application file for complete search history.

(56) References Cited

U.S. PATENT DOCUMENTS

| 2,461,447 | A |   | 2/1949  | Siesel  |         |
|-----------|---|---|---------|---------|---------|
| 2,831,383 | A |   | 4/1958  | Riess   |         |
| 2,924,134 | A |   | 2/1960  | Harmes  |         |
| 3,416,582 | A | * | 12/1968 | Jenks ............... | 74/127 |
| 4,063,474 | A | * | 12/1977 | Klopping .............. | 81/474 |
| 4,341,292 | A | * | 7/1982  | Acevedo .............. | 192/43 |
| 4,838,264 | A | * | 6/1989  | Bremer et al. ......... | 606/104 |
| 4,916,988 | A | * | 4/1990  | Robertson et al. ..... | 81/58.3 |
| 6,176,161 | B1 | * | 1/2001 | Huang et al. .......... | 81/441 |
| 6,701,813 | B1 | * | 3/2004 | Hu ....................... | 81/467 |
| 6,752,051 | B1 | * | 6/2004 | Hu ....................... | 81/475 |
| 6,766,718 | B1 | * | 7/2004 | Hu ....................... | 81/475 |
| 6,889,584 | B1 | * | 5/2005 | Amami ................. | 81/466 |

FOREIGN PATENT DOCUMENTS

| DE | 101 43 181 B4 | 3/2005 |
| EP | 0925878 A2    | 9/1998 |
| EP | 1112818 A2    | 12/2000 |

* cited by examiner

*Primary Examiner*—Lee D. Wilson
*Assistant Examiner*—Alvin J. Grant
(74) *Attorney, Agent, or Firm*—Muirhead & Saturnelli, LLC

(57) ABSTRACT

A screwdriver tool has a driving body and a tool shank mounted in the driving body so it can rotate about its axis. A device for transmitting a torque from the driving body to the tool shank interrupts the torque transmission if a predefined limiting torque is exceeded. In its longitudinal area accommodated in the driving body, the tool shaft has a clutch section featuring a non-circular cross section. At least one spring element adjoins the clutch section radially on the outside. The spring element is mounted in the driving body in a non-rotatable manner with respect to the axis of the tool shank and in a radially deflectable manner against its spring force.

21 Claims, 2 Drawing Sheets

SCREWDRIVER TOOL

FIELD OF THE INVENTION

The present invention relates to a screwdriver tool.

BACKGROUND OF THE INVENTION

Screwdriver tools equipped with a torque limiter are known. Such a screwdriver tool permits a torque to be applied to a part to be driven, for example, a screw. If the torque exceeds a predefined limiting torque, e.g., the specified tightening torque of a screw, the torque transmission is interrupted.

DE 101 43 181 A1 describes such a screwdriver in which the torque limiter is mounted in the handle. Torque is limited via a clutch whose parts are held engaged by a helical pressure spring and are disengaged against the force of the helical spring in the event the limiting torque is exceeded. The clutch and the helical pressure spring acting on the clutch require so much space that this torque limiter can only be used with bulkier handles.

Thus, it would be desirable to have a screwdriver tool in which the torque limiter has a compact, simple, and cost-effective design.

SUMMARY OF THE INVENTION

In one embodiment, a tool shank is rotatably located in a driving body, for example, the handle of a manual screwdriver. In the portion of its axial area disposed in the driving body, the tool shank has a clutch section featuring a non-circular cross section (e.g., the radius of the clutch section varies with rotation). A spring element is disposed circumferentially about this clutch section. The spring element is non-rotatably held in the driving body; however, it may be elastically and radially deflected. The spring element opposes the deflection with an elastic spring force. When the tool shank is inserted in the driving body, the clutch section assumes an orientation in which the spring element is adjacent to a side of the clutch section that is at the end of the smallest radius across the cross-section. If the driving body and the tool shank are rotated from this position with respect to one another, the spring element is elastically and radially deflected due to the increasing radius of the non-circular cross section. Therefore, when the driving body rotates, the tool shank is rotatingly entrained until a sufficiently great countertorque acts on the tool shank to deflect the spring element until it has a radius greater than the maximum radius of the non-circular cross section. If this limiting torque is exceeded, the spring element no longer holds the tool shank in a non-rotatable manner in the driving body. The tool shank rotates in the driving body, and torque transmission is interrupted.

In a particularly compact embodiment, the spring element is designed as a spring-elastic ring surrounding the clutch section of the tool shank. The ring includes one or more inwardly curved angular areas that are adjacent to the clutch section. If the clutch section has a polygonal cross section, the inwardly curved angular areas are adjacent to the sides of the polygon. In the case of a polygonal cross section, for example, a regular hexagonal cross section, inward-curved angular areas may be provided at the same angular spacing along the ring, so that the forces are exerted symmetrically by the spring element on the tool shank.

Employing a spring-elastic ring as a spring element surrounding the tool shank increases the outer diameter of the tool shank only a little, enabling an extremely compact arrangement in the handle of a screwdriver tool. Therefore, the torque limiter is particularly well-suited for fine screwdrivers such as screwdrivers having a key-type handle or a flat handle. The suitability of the torque limiter for such small screwdriver tools also results from the fact that the torque limiter according to the present invention may allow for low limiting torques.

The torque limiter is particularly cost-effective if the spring element is a plastic spring. If the spring force of a plastic spring is insufficient, the spring force may be increased by a spring metal insert. It is also possible to introduce wear-resistant inserts into the plastic material in those areas where the spring element is in contact with the clutch section to prevent erosion of the plastic material.

The spring element may be adjusted to the cross section of the clutch section in such a way that the spring element is not radially deflected if it is adjacent to the area of the periphery of the clutch section having the smallest radius. Therefore, in the resting state, when the screwdriver tool is not in use, no force is applied to the spring element, which would be deflected in response to the stress. Material fatigue of the spring element may thus be avoided. This is advantageous when the spring element is made of plastic because a permanent load on the plastic material over an extended period may cause the plastic material to creep, changing the shape and elastic properties of the spring element.

The elastic properties of the spring element and thus the limiting torque may be defined via the shape and composition of the spring element. If the spring element is designed as a ring surrounding the clutch section, the limiting torque may be varied in a particularly simple manner by changing the axial width of the ring.

The torque limiter described herein allows for simple and cost-effective assembly. In one embodiment, a spring element designed as a ring is inserted into a blind hole of the handle, which is coaxially traversed by the tool shank and closed by a handle cover.

BRIEF DESCRIPTION OF THE DRAWING

The invention is described with reference to the several figures of the drawing, in which.

DETAILED DESCRIPTION OF VARIOUS EMBODIMENTS

Figure 1:
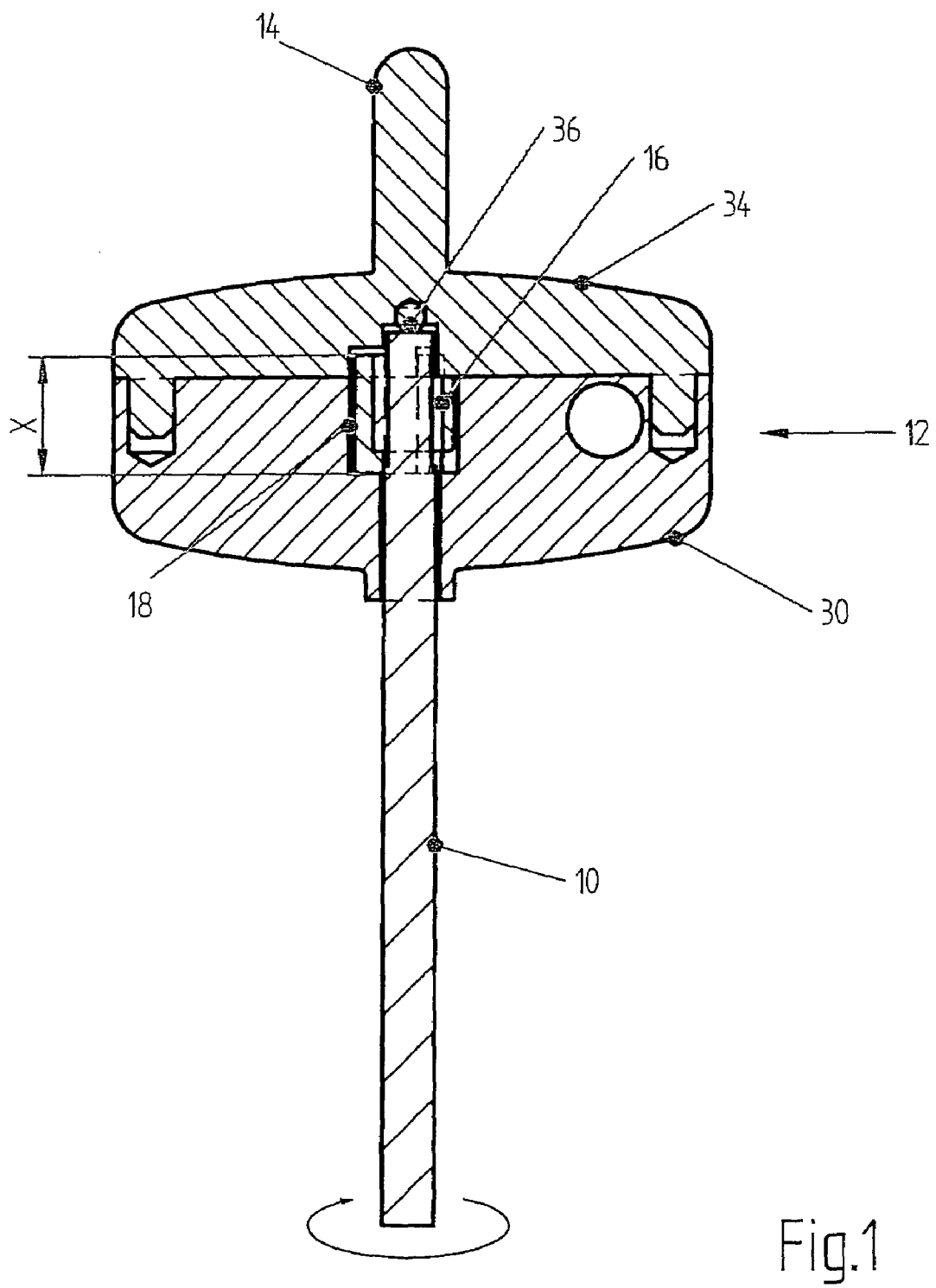
FIG. 1 shows a section of a screwdriver tool according to an exemplary embodiment.

In FIG. 1, an exemplary torque limiter is described with reference to a screwdriver tool having a key-type handle. One skilled in the art will recognize that other types of screwdrivers and handles may benefit from the teachings herein.

The screwdriver includes a tool shank 10 made of steel, the front end of which is designed as a working end (not illustrated). The rear end of tool shank 10 is inserted into a handle 12, which may be made of plastic. Handle 12 is a key-type handle and has the shape of a flat transverse handle having a support pin 14, which is formed in the axially flush extension of tool shank 10 on the rear end of handle 12.

The rear end of tool shank 10 is rotatably disposed in a bore hole of handle 12. At least in the end region accommodated in handle 12, tool shank 10 is fabricated as a clutch section 16 having a non-circular cross section. This non-circular cross section may be a polygonal cross section, for example, a hexagonal cross section. A spring element 18 is supported in handle 12 and is disposed about the external periphery of clutch section 16. Spring element 18 may have any desired shape. The spring element may be held non-rotatably in handle 12 in such a way that it is not entrained in the direction of rotation when clutch section 16 rotates in handle 12, e.g., the spring element does not rotate with respect to handle 12. In addition, spring element 18 may be in such a way that it is elastically deflected radially away from the non-circular cross section of clutch section 16 when clutch section 16 rotates in handle 12. In this embodiment, the spring force of spring element 18 acting on the periphery of clutch section 16 increases according to the spring constant as the radius of the adjacent portion of clutch section 16 increases. As a result, when the screwdriver is not in use (e.g., no torque is being transferred from handle 12 to tool shank 10), spring element 18 holds clutch section 16 in the orientation in which spring element 18 adjoins the peripheral area of clutch section 16 having the smallest radial distance from the central axis as long as the screwdriver is not used. That is, spring element 18 is in contact with clutch section 16 at the centers of the sides of the polygon. If a sufficiently large torque is applied via handle 12, a countertorque acting on tool shank 10, for example, due to the screw-in resistance of a screw, causes handle 12 and spring element 18 to be rotated with respect to clutch section 16. The point of engagement of spring element 18 shifts from the peripheral area having the smallest radius to peripheral areas having gradually increasing radii. Spring element 18 is elastically deflected radially outward, while its restoring spring force increases. This restoring spring force causes spring element 18 to press against the periphery of clutch section 16, causing tool shank 10 to rotate with respect to handle 12. Spring element 18 and the non-circular cross section of clutch section 16 thus cooperate as a torque clutch. Spring element 18 first holds clutch section 16 in a non-rotatable manner, preventing handle 12 from freely rotating on tool shank 10 until the torque transmitted from handle 12 to clutch section 16 has increased to the point that spring element 18 is elastically deflected radially in such a way that it moves beyond the peripheral area of clutch section 16 having the greatest radius. Therefore, when this limiting torque has been reached, the torque transmission from handle 12 to tool shank 10 is interrupted because the spring element 18 rotates with respect to tool shank 10. In the embodiment where clutch section 16 has a polygonal cross section of clutch section 16, the edges of the polygonal profile form the area of maximum radius.

Figure 2:
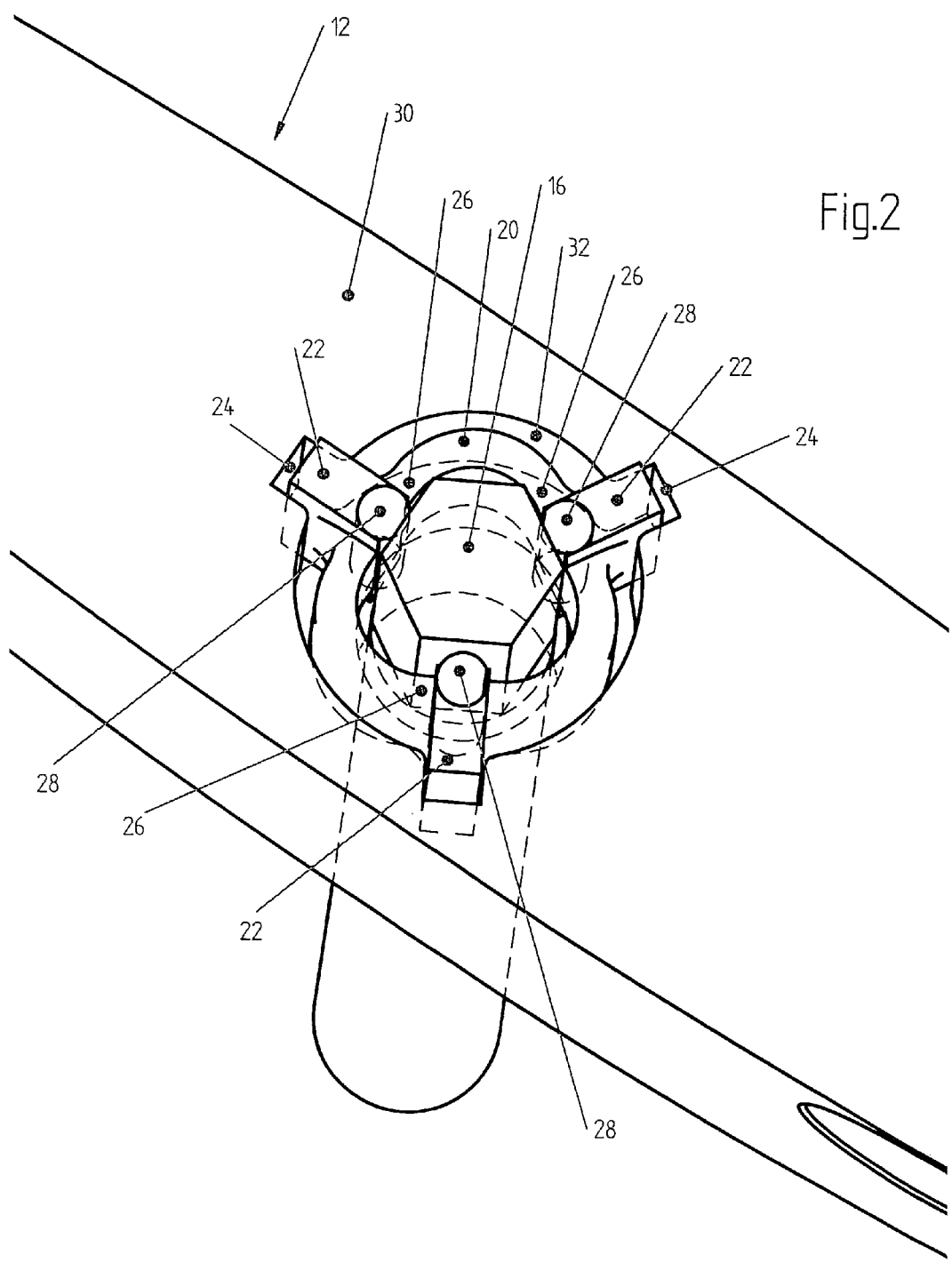
FIG. 2 shows a top view of the open handle of the screwdriver tool according to an exemplary embodiment.

As shown in FIG. 2, spring element 18 is designed as a ring 20 surrounding clutch section 16. The outer periphery of ring 20 includes radially protruding projections 22, which are preferably situated at the same angular distance from one another. Projections 22 engage radial pockets 24 of handle 12. Pockets 24 are dimensioned in such a way that their width in the circumferential direction is equal to the width of projections 22, and the radial depth of pockets 24 is greater than the radial dimension of projections 22. Projections 22 engaged with pockets 24 thus hold ring 20 non-rotatably in handle 12, but allow for a radial movement of ring 20.

Ring 20 has an inner diameter that is greater than the maximum outer diameter of clutch section 16. In predefined angular areas 26, ring 20 is curved inward from this greater inner diameter to the point that these inward-curving angular areas 26 of ring 20 adjoin the outer periphery of clutch section 16. In the embodiment in which clutch section 16 has a hexagonal cross section, ring 20 has three angular areas 26, offset by 120° from each other and curving inward, so that ring 20 acquires the shape of a rounded equilateral triangle, each side of which adjoins one side of the hexagonal profile of clutch section 16, so that three sides of clutch section 16 are in contact with ring 20.

In the rest position illustrated in FIG. 2, ring 20 holds clutch section 16 in such a way that curved angular areas 26 adjoin the center of the lateral surfaces of clutch section 16. These are the peripheral areas of clutch section 16 having the smallest radius. Ring 20 is dimensioned in such a way that it is not radially deflected (e.g., as a spring) in this position. If handle 12 is rotated with respect to clutch section 16 due to an applied torque, ring 20 also rotates together with handle 12. Angular areas 26 of ring 20, which adjoin the periphery of clutch section 16, travel toward the edges of the hexagonal profile which have a greater radial distance from the central axis. Angular areas 26 of ring 20 are elastically deflected in a radially outward direction, making them exert an elastic restoring force on clutch section 16, so that clutch section 16 and thus the tool shank are entrained by handle 12 in the direction of rotation. When the limiting torque is reached, angular areas 26 are elastically deflected in a radially outward direction to the point at which they are lifted over the edges of the profile of clutch section 16, enabling clutch section 16 to rotate in ring 20 and thus in handle 12.

As shown in FIG. 2, ring 20 has three projections 22 offset with respect to one another at a 120° angle, which are formed on the outside of the ring in curved angular areas 26. Ring 20 may be fabricated from plastic to reduce manufacturing costs. The spring force of ring 20 and thus the limiting torque defined by ring 20 may be adjusted by choosing a plastic material with particular mechanical properties and selecting an appropriate radial wall thickness for ring 20. In particular, the axial width of ring 20 may also be varied to determine the spring constant and thus the limiting torque. Manufacturing ring 20 of plastic results in particularly favorable manufacturing costs. If a higher spring force and thus a higher limiting torque is required, plastic ring 20 may be reinforced by a spring metal insert. Ring 20 may also be manufactured entirely of spring metal, thus achieving a higher spring force and thus a higher limiting torque.

To reduce the wear of the plastic material of ring 20 in the angular areas where ring 20 adjoins clutch section 16, wear-resistant inserts 28 may be integrated into the plastic material of ring 20 in curved angular areas 26. In one embodiment, these inserts 28 are steel pins, which are inserted into ring 20 parallel to the axis in inward-curving angular areas 26.

The screwdriver tool is easy to assemble. As shown in FIG. 1, handle 12 has a handle body 30, which is traversed by the bore hole receiving the rear end of tool shank 10. The bore hole receiving tool shank 10 widens to a blind hole 32 (FIG. 2) at the rear end face of handle body 30. Clutch section 16 of tool shank 10 protrudes coaxially into this blind hole 32. Radial pockets 24 are formed on the outer periphery of blind hole 32. Ring 20 may be inserted into blind hole 32 from the open rear end face and pushed over clutch section 16. A handle cover 34 is then placed onto the rear end face of handle body 30 and clamped, glued, welded, or otherwise attached to handle body 30. A steel bearing ball 36 may be inserted into handle cover 34 to provide axial support to the rear end face of tool shank 10. Bearing ball 36 minimizes the friction between tool shank 10 and handle cover 34, so that the limiting torque defined by ring 20 is not affected by this friction.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A screwdriver tool comprising:
   a driving body;
   a tool shank accommodated in the driving body so it can rotate about its axis;
   and a device for transmitting a torque from the driving body to the tool shank which interrupts the torque transmission when a predefined limiting torque is exceeded, wherein:
   the tool shank includes a clutch section having a non-circular cross section in a longitudinal area accommodated in the driving body;
   at least one spring element adjoins the clutch section radially outside;
   and the spring element is mounted in the driving body in a non-rotatable manner with respect to the axis of the tool shank and in a radially deflectable manner, with respect to the axis of the tool shank, against its spring force.

2. The screwdriver tool as recited in claim 1, wherein the spring element is not deflected in a radial manner when it adjoins the angular peripheral area of the clutch section having the smallest radius.

3. The screwdriver tool as recited in claim 1, wherein the spring element includes a spring-elastic ring which surrounds the clutch section and that includes at least one inward curved angular area adjoining the clutch section.

4. The screwdriver tool as recited in claim 3, wherein the clutch section has a polygonal cross section.

5. The screwdriver tool as recited in claim 4, wherein the clutch section has a hexagonal cross section, and the ring has a cross section in the shape of a rounded equilateral triangle whose sides define three inward-curving angular areas.

6. The screwdriver tool as recited in claim 3, wherein the ring includes, on its outer surface, at least one radial projection disposed in a mating radial pocket in the driving body.

7. The screwdriver tool as recited in one of claim 3, wherein the ring is made of spring metal.

8. The screwdriver tool as recited claim 3, wherein the ring is made of plastic.

9. The screwdriver tool as recited in claim 8, wherein the ring includes an insert made of spring metal.

10. The screwdriver tool as recited in claim 8, wherein the ring includes a plurality of wear-resistant inserts which are in contact with the clutch section.

11. The screwdriver tool as recited in claim 10, wherein the inserts are steel pins inserted parallel to the axis of the ring.

12. The screwdriver tool as recited in claim 1, wherein the driving body is a handle.

13. The screwdriver tool as recited in claim 12, wherein the handle includes a handle body and a handle cover, the handle body including a blind hole that is closed by the handle cover and that accommodates the spring element, wherein the clutch section coaxially protrudes into the blind hole.

14. A screwdriver tool comprising:
    a driving body;
    a tool shank including a clutch section having a non-circular cross disposed within in the driving body; and
    at least one spring element disposed within the driving body and circumferentially disposed about the clutch section of the tool shank, wherein applying a torque below a predetermined level causes the clutch section to radially deflect the spring element with respect to the axis of the tool shank to rotatably engage the tool shank and the driving body and wherein applying a torque above the predetermined level causes the clutch section to disengage from the spring element allowing the driving body to freely rotate about the tool shank.

15. The screwdriver tool as recited in claim 14, wherein the spring element is not radially deflected when it adjoins the angular peripheral area of the clutch section having the smallest radius.

16. The screwdriver tool as recited in claim 14, wherein the spring element includes a spring-elastic ring which surrounds the clutch section and that includes at least one inward curved angular area adjoining the clutch section.

17. The screwdriver tool as recited in claim 16, wherein the clutch section has a hexagonal cross section, and the spring-elastic ring has a cross section in the shape of a rounded equilateral triangle whose sides define three inward-curving angular areas.

18. The screwdriver tool as recited in claim 16, wherein the spring-elastic ring includes, on its outer surface, at least one radial projection disposed in a mating radial pocket in the driving body.

19. The screwdriver tool as recited in claim 16, wherein the spring-elastic ring comprises one or more of spring metal and plastic.

20. The screwdriver tool as recited in claim 19, wherein the spring-elastic ring includes a plurality of wear-resistant inserts which are in contact with the clutch section.

21. The screwdriver tool as recited in claim 14, wherein the driving body comprises a handle including a handle body and a handle cover, the
    handle body including a blind hole that is closed by the handle cover and that
    accommodates the spring element, wherein the clutch section coaxially protrudes into the
    blind hole.

* * * * *